United States Patent [19]

Tomioka et al.

[11] Patent Number: 5,066,333
[45] Date of Patent: Nov. 19, 1991

[54] FILLER FOR PATTERNING OF CERAMICS PRODUCT AND PROCESS FOR PRODUCING THE SAME

[75] Inventors: Yutaka Tomioka; Satoru Nakanishi; Seizi Shintake; Hideki Yoneda, all of Kitakyushu, Japan

[73] Assignee: Toto Ltd., Fukuoka, Japan

[21] Appl. No.: 436,302

[22] Filed: Nov. 13, 1989

[30] Foreign Application Priority Data

Nov. 16, 1988 [JP] Japan ................................ 63-290775

[51] Int. Cl.$^5$ ............................................ C04B 14/00
[52] U.S. Cl. ................................................. 106/400
[58] Field of Search ........................................ 106/400

[56] References Cited

U.S. PATENT DOCUMENTS 3,977,891 8/1976 Bertrand ............................. 106/400
4,116,924 9/1978 Peabody ............................. 106/400
4,681,862 7/1987 Kawabe et al. ..................... 106/400

FOREIGN PATENT DOCUMENTS 89121153.4 of 0000 European Pat. Off. .

OTHER PUBLICATIONS

Derwent Publication Abstract & JP-A-57-22 187 (Matsushita Elec. Works).

Primary Examiner—William R. Dixon, Jr.
Assistant Examiner—Willie J. Thompson
Attorney, Agent, or Firm—Ladas & Parry

[57] ABSTRACT

A filler for patterning of ceramics product, comprising a slip composed mainly of a ceramics base material having a binder and a pigment added therein formed into particulate.

15 Claims, No Drawings

FILLER FOR PATTERNING OF CERAMICS PRODUCT AND PROCESS FOR PRODUCING THE SAME

BACKGROUND OF THE INVENTION

This invention relates to a filler for having a pattern such as grain pattern formed on ceramics product such as toilet stools, washing basins, counters, tiles, accessories, tombstones or craftworks, and relates to a process for producing the same.

In the prior art, as the filler for exhibiting a pattern such as grain pattern on ceramics product, natural raw stone grain, metallic powder and colored fragments of fired ceramic have been used. By kneading these fillers with kneading mud and extruding the mixture, or by mixing them with base material powder and molding the mixture by way of pressing, ceramics products of grain pattern have been obtained.

When natural raw stone grain, metallic powder or colored fragments of fired ceramic, etc. have been used, there has been the problem that warping and cutting are liable to be generated due to the difference in firing shrinkage or expansion coefficient during the firing step. Also, in the case of molding by slip casting, when the particle size of the filler becomes a certain particle size or larger, separation or sedimentation occurs in the slip due to the difference in specific gravity between the filler and the slip for formation of ceramics, whereby it becomes difficult to form a pattern such as uniform grain pattern. Even if it can be formed, the filler comprising raw stone grain, metallic powder and colored fragments of fired ceramic cannot be cut easily, and working and finishing under the state of green base material cannot be easily accomplished. This also posed a similar problem in dried base material, and due to the difference in hardness between the filler such as raw stone grain, metallic powder and colored fragments of fired ceramic and the slip for ceramics molding, cutting, working or finishing of the cast molded product could not be easily accomplished.

Further, in the slip casting step, the conventional filler such as the raw stone grain, metallic powder and colored fragments of fired ceramic and the slip for ceramics molding were poorly compatible with each other due to different material characteristics of the components, whereby there was the problem that cutting or cracking is liable to be generated in the molded product. Further, during the firing step, since the conventional filler and the slip for ceramics molding are different in firing shrinkage and expansion coefficient, warping or cutting, are liable to be generated, whereby there has been the problem that variation of color formation after firing has been limited.

SUMMARY OF THE INVENTION

An object of the present invention is to overcome the drawbacks of the prior art as described above and provide a novel filler for patterning of ceramics product. The filler can form a pattern such as uniform stone grain pattern on ceramics product such as toilet stools, washing basins, counters, tiles, accessories, tombstones or craftworks, and can effect easily complicated working or finishing. The filler hardly causes warping or cutting, and can give a predetermined color variation after firing.

The filler for patterning of ceramics product of the present invention which has been developed for accomplishing the above object comprises a slip composed mainly of a ceramics base material having a binder and a pigment added therein formed into particulate.

The filler of the present invention is obtained by drying a slip composed mainly of a ceramics base material prepared by adding a binder and a pigment into a slip of ceramics-base-like material prepared by mixing and crushing pottery stone, clay, feldspar, etc. conventionally used, then crushing and dried slip by means of a crusher, etc. and sorting the powder into predetermined particle sizes by a sieve, etc.; or after drying of the above slip, the dried slip may be crushed by a crushing machine and granulated by a granulator, followed by sorting into predetermined particle sizes by a sieve, etc. It can be also obtained by granulating the slip composed mainly of the ceramics base material having added a binder and a pigment therein by a spray dryer, etc., followed by sorting into predetermined sizes by a sieve, etc.

Alternatively, the slip composed mainly of the ceramics base material having a binder and a pigment added therein may be once dehydrated into a mixture like kneaded mud, extruding the mixture through a mud kneading machine having a die shaped in a pore of a predetermined diameter, cutting the extrudate into a predetermined shape and drying the product thus cut to give a ceramics base material filler; or the filler of ceramics-base-like material may be washed with water to remove the attached fine particulate powder, thereby to have water absorbed in the filler.

DETAILED DESCRIPTION OF THE INVENTION

As the binder to be used in the present invention, a water-soluble binder or an emulsion type binder may be used either singly or in a mixture of plural kinds.

As the water-soluble binder, methyl cellulose, ethyl cellulose, hydroxyethyl cellulose, carboxymethyl cellulose, polyvinyl alcohol, methyl starch, etc. can be used. On the other hand, as the emulsion type binder, polyisobutylene, polybutene, resin emulsion, vinyl acetate resin emulsion, acrylic resin emulsion and an emulsion binder of a copolymer resin of them can be used. However, in the present invention, the binders as mentioned above are not limitative, but binders known in the prior art can be used, provided that the effect of the present invention can be obtained.

The pigment to be used in the present invention is not particularly limited, but pigments which have been used in the prior art can be suitably used. Specifically, mixtures of various oxides, spinel can be used.

It is essential to use the above-mentioned ceramics base material having a binder and a pigment added therein, which has a composition of the same quality as the ceramics to be patterned. Accordingly, as the base material for ceramics, it can be selected so as to be suited for the purpose corresponding to the composition of the material to be patterned.

The contents of the above ceramics base material, binder and pigment can be selected suitably within optimum ranges corresponding to the state of the pattern to be obtained. In general, the ceramics base material should be desirably within the range of from 55 to 98% by weight, preferably from 65 to 90% by weight, the binder from 0.1 to 20% by weight, preferably from 1 to 15% by weight, and further the pigment from 1 to 30% by weight, preferably from 3 to 25% by weight.

In the present invention, in addition to the above-mentioned principal components, as additional components, if necessary, it is possible to add inorganic short fibers, whiskers, glass flakes, deflocculants, dispersing agents, lubricants, agglomerating agents, surfactants, drying promoters, or surface modifiers, etc.

The filler for patterning according to the present invention is obtained by forming a slip comprising the above-mentioned ceramics base material, pigment and binder into particulate shape.

As the method for granulation, the granulation means, the crushing means or the classification means used in the conventional art can be suitably used. Specifically, there may be included the following methods.

(1) The method in which a slip is dried, then crushed by a crusher and sorted into predetermined particle sizes by a sieve.

(2) The method in which a slip is dried, then crushed by a crushing machine, granulated by a granulating machine, and then sorted into predetermined particle sizes by a sieve.

(3) The method in which a slip is granulated by a spray dryer and sorted into predetermined sizes by a sieve.

(4) The method in which a slip is once dehydrated into a mixture like kneaded mud, the mixture is extruded through a mud kneader having a die with a pore shape of a predetermined diameter, then cut into a predetermined shape and the product thus cut is dried.

In the present invention, the filler obtained as described above should preferably be washed with water to remove the attached fine powder and further absorb water. By having thus water previously absorbed in the filler, said filler can be made to have further excellent compatibility with the material to be mixed (namely, the slip for formation of ceramics to be patterned).

The particulate shape of the filler according to the present invention can be controlled freely according to the pattern, design of the product.

The present invention is described in more detail below by referring to Examples. In the following description, "%" is based on weight, unless otherwise particularly noted.

EXAMPLE 1

(1) To a slip comprising 55% of pottery stone, 25% of clay and 20% of feldspar are added 5% of black stain and 10% of zircon.

(2) After addition, the mixture is mixed homogeneously by means of a ball mill.

(3) After mixing, the mixture is purified through a sieve of 100 mesh/inch.

(4) To the slip for ceramics molding thus purified, as the binder, 7% of a polymeric hydrocarbon polyisobutylene type emulsion (manufactured by Nippon Sekiyu K.K., Japan, trade name: Nisseki Ceramate T500) is added, followed by stirring.

(5) The stirred mixture of the slip for ceramics molding and the binder is completely dried at 110° C. to be solidified.

(6) The thus solidified product is granulated by crushing by means of a crushing machine such as crusher.

(7) The granulated product is sorted by a sieve into a filler with sizes of from 0.6 mm to 2.0 mm.

(8) The filler of ceramics-base-like material is washed with water to remove the attached fine powder, followed by absorption of water.

(9) The filler of the ceramics base material quality is subjected to dewatering and then stored with drying-proof.

EXAMPLE 2

(1) To a starting material for ceramics molding comprising 36% of sericite type pottery stone, 25% of kaolin type pottery stone, 14% of feldspar and 25% of clay, 10% of blue stain and 5% of zircon, water and 10% of a polyisobutylene (manufactured by Nippon Sekiyu K.K., Japan, trade name: Nisseki Ceramate T500) are added.

(2) After addition, the mixture is finely ground by a ball mill.

(3) After fine grinding, the mixture is purified through a sieve of 100 mesh/inch.

(4) The thus obtained slip is squeezed through a filter press to form a kneaded mud with a water content of 20% to 25%.

(5) The thus kneaded mud is extruded through a mud kneader having a die with a pore shape of 3 mm in diameter, and the extruded product is cut into a predetermined shape, and the cut product is completely dried at 110° C.

(6) The filler of ceramics-base-like material is washed with water to remove the attached fine powder, followed by absorption of water.

(7) The filler of ceramics-base-like material is subjected to dewatering, and then stored with drying-proof.

The present invention, which is constituted as described above, achieves the following advantages.

(a) Since the filler is molded with the starting material for the ceramics base material as the main component, its components can be made the same as the components of the slip for ceramics molding.

For this reason, there is no difference in such properties as shrinkage or water absorption after firing from the ceramics base material, whereby there is little defect such as warping or cutting after firing, and finishing after drying can be easily done.

(b) Since refractoriness of the filler and the slip for ceramics molding can be controlled easily by varying the formulation ratio, it is possible to vary water absorption or strength after firing.

(c) By addition of a binder in the filler of the ceramics base material quality, during mixing with the slip for ceramics molding, swelling or dissolution of the filler of ceramics-base-like material can be prevented.

(d) Addition of a binder in the ceramics base material can enhance the dry strength which is about 40 kg/cm$^2$ when no binder is added to about 70 kg/cm$^2$.

(e) During slip casting by mixing filler into a slip for ceramics molding, cutting, etc. will be generated with difficulty in said slip casting step, whereby even in the firing step, a predetermined color variation can be obtained after firing.

(f) In the slip casting step of ceramics, during working of the green base material with a water content of 23% to 28% after demolding, since the filler itself of ceramics-base-like material exhibits the same characteristics as the green base material, working such as cutting of the filler can be done similarly as working of the green base material.

(g) The present filler of ceramics-base-like material can be mixed into a slip for ceramics molding to enable slip casing only where pattern formation is needed or to enable molding with spraying against a mold surface on a surface of molded ceramic article to be patterned by means of a mortar gun. In this case, the portion where pattern formation is not needed can be formed by cast molding of a slip containing no filler, whereby a desired pattern such as uniform stone grain pattern, can be formed on a ceramics product having a complicated shape. Further, pattern formation can be done by mixing the filler of ceramics-base-like material with the base material powder and press molding the mixture or by mixing the filler of ceramics-base-like material with the kneaded mud and extruding the mixture.

(h) Water may be absorbed into the filler when it is used to prevent coverage of the filler with the film of slip when the filler is mixed into the slip for ceramics molding, whereby compatibility can be improved far better.

(i) Since the filler has a composition similar to the components of the ceramics base material to be patterned, the filler will have a hardness substantially the same as that of the base material, whereby polishing will become easier. Further, because of this, pattern having three-dimensional appearance due to the presence of the filler can be formed by polishing the surface of the ceramics product.

We claim:

1. A filler for patterning a ceramics product, wherein said ceramics product exhibits, upon firing, specific shrinkage and water absorption properties, and wherein the filler is dispersed into the ceramics product to impart a natural stone grain pattern to the ceramics product, the filler comprising
    (a) a ceramics base material, said ceramics base material being present in the filler in an amount such that, and having a composition sufficiently similar to the composition of the ceramics product such that, upon firing, the filler exhibits substantially the same shrinkage and water absorption properties as the ceramics product;
    b) a pigment; and
    c) a binder effective substantially to prevent swelling or dissolution of the filler during mixing with a slip for the ceramics product.

2. A filler as claimed in claim 1 wherein the binder is a water-soluble or emulsion type binder.

3. A filler as claimed in claim 2 wherein the binder is a water-soluble type binder selected from the group consisting of methyl cellulose, ethyl cellulose, hydroxyethyl cellulose, carboxymethyl cellulose, polyvinyl alcohol, and methyl starch.

4. A filler as claimed in claim 3 wherein the binder is an emulsion type binder selected from the group consisting of polyisobutylene resin emulsion, polybutene resin emulsion, vinyl acetate resin emulsion. acrylic resin emulsion and a copolymer resin emulsion formed from the polyisobutylene, polybutene, vinyl acetate and acetate resin emulsions.

5. A filler as claimed in claim 1 wherein the ceramics base material is present in an amount of about 55 to 98% by weight, the binder is present in an amount of about 0.1 to 20% by weight and the pigment is present in an amount of about 1 to 30% by weight.

6. A filler as claimed in claim 5 wherein the particulate shape of said filler has been formed by granulation.

7. A process for producing a filler for patterning a ceramics product, wherein said ceramics product exhibits, upon firing, specific shrinkage and water absorption properties, and wherein the filler is dispersed into the ceramics product to impart a natural stone grain pattern to the ceramics product, the process comprising the steps of:
    a) preparing a slip for the filler comprising a.ceramics base material, a pigment and a binder, said ceramics base material being present in the filler slip in an amount such that, and having a composition sufficiently similar to the composition of the ceramics such that, upon firing, the filler exhibits substantially the same shrinkage and water absorption properties as the ceramics product, said binder being effective substantially to prevent swelling or dissolution of the filler during mixing with a slip for the ceramics product;
    b) drying the filler slip; and
    c) crushing the thus dried filler slip.

8. A process as claimed in claim 7 wherein the binder is a water-soluble or emulsion type binder.

9. A process as claimed in claim 7 wherein the ceramics base material is present in an amount of about 55 to 98% by weight, the binder is present in an amount of about 0.1 to 20% by weight, and the pigment is present in an amount of about 1 to 30% by weight.

10. A process for producing a filler for patterning a ceramics product, wherein said ceramics product exhibits, upon firing, specific shrinkage and water absorption properties, and wherein the filler is dispersed into the ceramics product to impart a natural stone grain pattern to the ceramics product, the process comprising the steps of:
    a) preparing a kneaded-mud-like mixture comprising a ceramics base material, a pigment and a binder, said ceramics base material being present in the filler slip in an amount such that, and having a composition sufficiently similar to the composition of the ceramics such that, upon firing, the filler exhibits substantially the same shrinkage and water absorption properties as the ceramics product, said binder being effective substantially to prevent swelling or dissolution of the filler during mixing with a slip for the ceramics product;
    b) forming the kneaded-mud-like mixture into particulate shape; and
    c) drying the thus formed kneaded-mud-like mixture to obtain a filler.

11. A process as claimed in claim 10 wherein the binder is a water-soluble or emulsion type binder.

12. A process as claimed in claim 10 wherein the ceramics base material is present in an amount of about 55 to 98% by weight, the binder is present in an amount of about 0.1 to 20% by weight, and the pigment is present in an amount of about 1 to 30% by weight.

13. A process for producing a filler for patterning a ceramics product, wherein said ceramics product exhibits, upon firing, specific shrinkage and water absorption properties, and wherein the filler is dispersed into the ceramics product to impart a natural stone grain pattern to the ceramics product, the process comprising the steps of:
    a) preparing a slip for the filler comprising a ceramics base material, a pigment and a binder, said ceramics base material being present in eh filler slip in an amount such that, and having a composition sufficiently similar to the composition of the ceramics such that, upon firing, the filler exhibits substantially the same shrinkage and water absorption properties as the ceramics product, said binder being effective substantially to prevent swelling or dissolution of the filler during mixing with a slip for the ceramics product; and b) spraying and drying the slip to obtain a filler.

14. A process as claimed in claim 13 wherein the binder is a water-soluble or emulsion type binder.

15. A process as claimed in claim 13 wherein the ceramics base material is present in an amount of about 55 to 98% by weight, the binder is present in an amount of about 0.1 to 20% by weight, and the pigment is present in an amount of about 1 to 30% by weight.

* * * * *